United States Patent [19]

Bechman et al.

[11] Patent Number: 4,758,052
[45] Date of Patent: Jul. 19, 1988

[54] METHOD AND APPARATUS FOR BRAKING HEAVY VEHICLES

[75] Inventors: William H. Bechman, Morton; Richard A. Doversberger, East Peoria, both of Ill.

[73] Assignee: Dresser Industries, Inc., Dallas, Tex.

[21] Appl. No.: 15,066

[22] Filed: Feb. 17, 1987

[51] Int. Cl.$^4$ ................. B60T 13/00; B60T 13/22; B60T 11/10
[52] U.S. Cl. ........................ 303/9; 303/9.63; 303/71; 188/151 A
[58] Field of Search ............. 188/151 A, 151 R; 303/2, 6 A, 6 R, 8, 9, 13, 84 A, 71

[56] References Cited

U.S. PATENT DOCUMENTS

| | | | |
|---|---|---|---|
| 3,473,851 | 10/1969 | Castello-Bramco | 303/84 A |
| 3,528,707 | 9/1970 | Casey | 303/10 |
| 3,547,234 | 12/1970 | Smith et al. | 188/106 |
| 3,572,846 | 3/1971 | Cruse | 303/9 |
| 3,601,451 | 8/1971 | Cummins et al. | 303/13 |
| 3,808,449 | 4/1974 | Peruglia | 307/10 |
| 3,974,899 | 8/1976 | Mita et al. | 192/3 M |
| 4,024,712 | 5/1977 | Takeuchi | 60/535 |
| 4,045,768 | 8/1977 | Klimek | 188/151 A X |
| 4,128,276 | 12/1978 | Beck et al. | 303/13 |
| 4,534,598 | 8/1985 | Cuhel | 303/9 X |

Primary Examiner—Andres Kashnikow
Assistant Examiner—Timothy Newholm
Attorney, Agent, or Firm—Roy L. Van Winkle

[57] ABSTRACT

A hydraulically-actuated brake system for off-road, heavy vehicles that includes separate accumulators for braking the front and rear brakes and brake valves that are both manual and pilot actuated for controlling the flow of hydraulic fluid from the accumulators to the brakes. Also included are valves for comparing the pressure in the front and rear accumulators so that, should one of the systems become low, the brakes are immediately set. Also included is a manual valve for overriding the brake valves in the event that a malfunction occurs in one of the brake valves.

2 Claims, 1 Drawing Sheet

1

METHOD AND APPARATUS FOR BRAKING HEAVY VEHICLES

BACKGROUND OF THE INVENTION

This invention relates generally to brake systems for heavy vehicles. More particularly, but not by way of limitation, this invention relates to an improved method and apparatus for braking heavy vehicles such as those used in mining operations and other off road applications, wherein the system includes back-up and alternate braking arrangments.

Braking systems constructed for the extremely large and heavy off-road vehicles generally include redundant systems so that in case of failure of one system, a back-up exists. More often than not, such systems, because of the redundancy, are rather complex, bulky and expensive. Manifestly, in the type of service to which such vehicles are exposed, it is highly desirable to avoid as much complexity as possible providing back-up circuits for safety and avoiding the maintenance and reliability problems often present in more complex components.

Accordingly, an object of this invention is to provide an improved control system and method for braking a vehicle which is relatively simple in construction and operation, is purely hydraulic, provides for back-up brake systems, and includes well known and proven components that are relatively simple in construction and known for their reliability.

SUMMARY OF THE INVENTION

This invention then, in one aspect, provides an improved hydraulically actuated brake system for such off road heavy vehicles that includes an accumulator for braking the rear brakes, an accumulator for braking the front brakes, and manual and pilot actuated brake valves associated with each accumulator for controlling flow from the accumulators to the brakes. Interposed in the system is a valve for comparing the pressures in the two accumulators and provides a low pressure output so that when such pressure decreases below a preselected value, a pilot actuated trigger valve is actuated. Pressure for actuating the brakes is supplied to the trigger valve by a valve that compares the accumulator pressures. The output of the valve is the higher pressure of the two. If the low pressure output is below a predetermined value, the high pressure is immediately applied to the pilot portions of the brake valves overriding manual operation thereof and immediately connecting the accumulators with their respective brakes to cause setting of the brakes.

In another aspect, this invention provides a method of setting the brakes on a vehicle that contemplates comparing the pressure in the two systems to provide a low pressure signal, comparing the pressure in the two systems to provide a high pressure signal, and actuating a valve to deliver the high pressure fluid to brake valves when the low pressure is below a predetermined value.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figures 1, 2, 3:
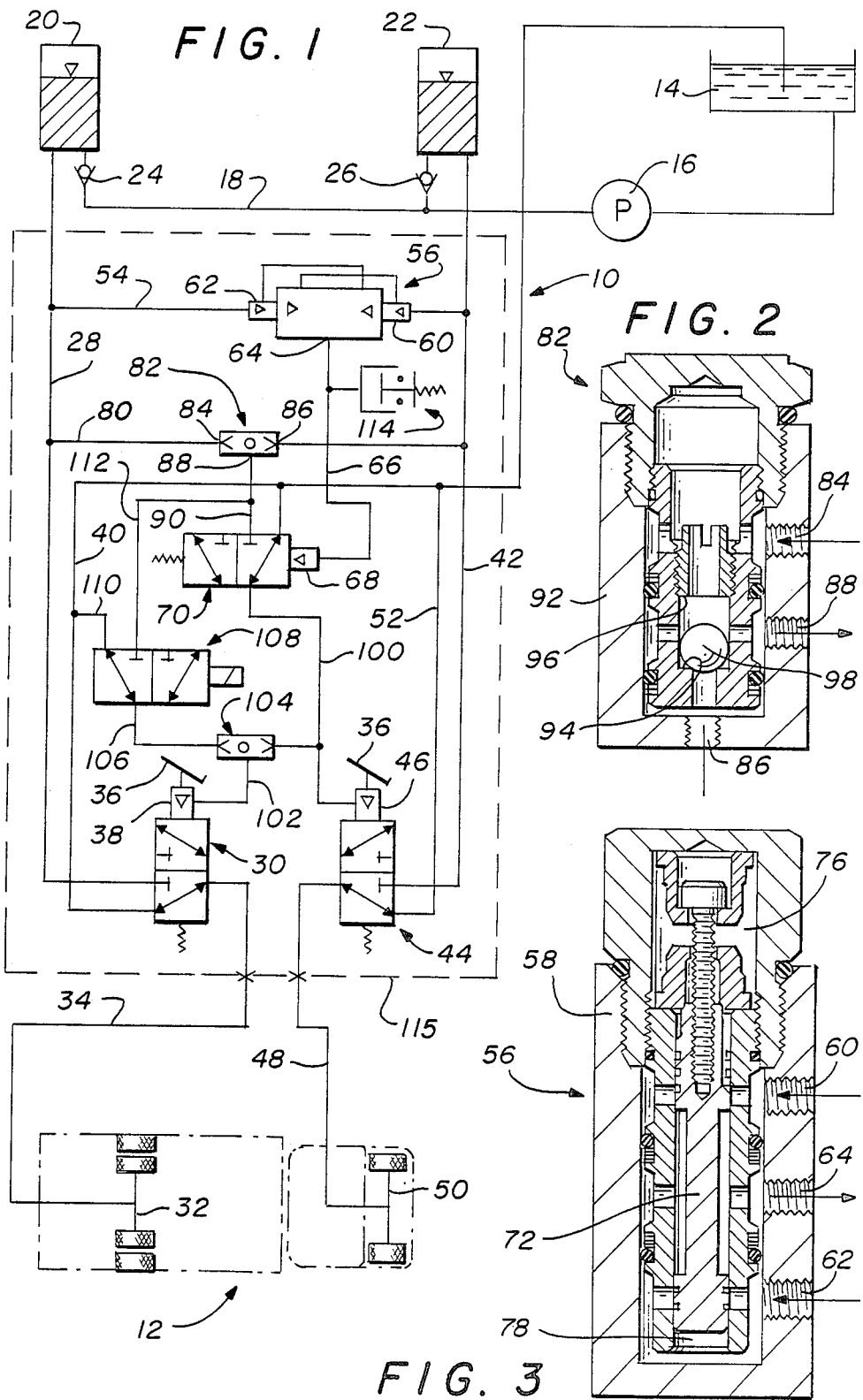
FIG. 1 is a schematic circuit diagram illustrating a brake control system that is constructed in accordance with the invention.
FIG. 2 is an enlarged cross-sectional view of a valve utilized in the system of FIG. 1 to compare the pressures in the two accumulators that has as an output the higher of the two pressures.
FIG. 3 is a cross-sectional view of a valve utilized in the system for comparing the pressures in the two accumulators that has as an output is the lower of the two pressures.

Referring to the drawing and to FIG. 1 in particular, shown therein and generally designated by the reference character 10, is a brake control system that is constructed in accordance with the invention. The brake control system 10 is illustrated as being connected to the brakes of an off-road, heavy duty truck 12 shown in dash lines in FIG. 1.

The system 10 includes a hydraulic reservoir 14 that is connected to a hydraulic pump 16 which may be of any suitable design for use with brake systems. The pump 16 is connected by a conduit 18 with a rear brake accumulator 20 and a front brake accumulator 22. The conduit 18 includes check valves 24 and 26 that are located upstream of the accumulators 20 and 22, respectively.

The accumulator 20 is connected by a conduit 28 with a rear brake valve 30. The rear brake valve 30 is connected to the rear brakes 32 of the truck 12 by a conduit 34. The rear brake valve 30 is of the type that may be actuated manually by treadle 36 or by a pilot actuator 38. The pilot actuator 38 is arranged to override the manual treadle 36. The valve 30 is of the three-way type and has a return line 40 connected thereto which returns fluid from the rear brakes to the reservoir 14.

The accumulator 22 is connected by a conduit 42 with a front brake valve 44 which is also of the three way type. The valve 44 is identical to the valve 30 and is also manually operable by the treadle 36 or by a pilot actuator 46. A conduit 48 connects the valve 44 with the front brakes 50 on the truck 12. The valve 44 is connected to the reservoir through a conduit 52 that is connected with the conduit 40 for return of the fluid from the front brakes 50 to the reservoir 14.

A conduit 54 extends between the conduits 28 and 42 and has a first pressure comparison means or inverted shuttle valve 56 located in the conduit 54.

FIG. 3 illustrates in enlarged detail a cross section of the inverted shuttle valve 56 that is shown schematically in FIG. 1. As illustrated in FIG. 3, the shuttle valve 56 includes an inlet port 60 that is connected to the accumulator 22, an inlet port 62 that is connected to the accumulator 20, and an outlet port 64 connected to a conduit 66 that extends to a pilot port 68 on trigger valve 70. The outlet port 64, as will be explained, will be in fluid communication with the inlet port 60 or 62, whichever is at the lowest pressure.

The inverted shuttle valve 56 also includes a movable shuttle member 72 that is generally positioned in a central location within the housing 58. As can be seen in FIG. 3, the inlet port 60 is in communication with a chamber 76 at the upper end of the valve 56 and the inlet port 62 is in communication with a chamber 78 in the lower end thereof. The arrangement is such that if the port 60 contains higher pressure as compared to the port 62, the shuttle 72 will be biased downwardly permitting communication between the inlet port 62 and the outlet port 64. Thus, the port 64 will be at the lower pressure which is in the port 62. Conversely, if the pressure in the inlet port 62 is greater than the pressure in the inlet port 60, the shuttle 72 is moved upwardly by pressure in the chamber 78, placing the inlet port 60 and the outlet port 64 in communication so that the port 64 reflects the lower pressure of the inlet port 60.

A conduit 80 connects the conduits 28 and 42 in parallel with the conduit 54. Located in the conduit 80 is a second pressure comparing means or shuttle valve 82 that is shown in more detail in the enlarged cross-sectional view of FIG. 2. As shown therein, the shuttle valve 82 includes a first inlet port 84 that is connected to the accumulator 20, a second inlet port 86 that is connected to the accumulator 22, and an outlet port 88 that is connected to a conduit 90 that extends to the trigger valve 70.

The shuttle valve 82 includes a valve housing 92 defining valve seats 94 and 96. A movable valve member 98 is located within the valve and is positioned to move and to sealingly engage one of the seats 94 or 96 in accordance with the fluid flow. If higher pressure exists in the inlet port 84, the valve member 98 will be displaced downwardly, as illustrated in FIG. 2, closing the inlet port 86 connecting the outlet port 88 in fluid communication with the inlet port 84. Similarly, higher pressure in inlet port 86 displaces the valve member 98 into sealing engagement with the seat 96, providing communication from the inlet port 86 to the outlet port 88. In both cases, it will be appreciated that the outlet port 88 will be at the higher pressure existing in the inlet port 88 or 86.

The trigger valve 70 is connected by a conduit 100 with the pilot actuator 46 of the front brake valve 44. The trigger valve is also connected to the rear brake valve 30 by a conduit 102 that extends between the pilot actuator 38 of the rear brake valve 30 and the conduit 100. Interposed in the conduit 102 is a third pressure comparison valve or shuttle valve 104 which is identical to the shuttle valve 82 previously described in detail.

The shuttle valve 104 is connected by a conduit 106 with a manually actuated brake lock valve 108. The brake lock valve is also a three way valve and has a port thereof connected by the conduit 110 with the return conduit 40 and has another port thereof connected to the conduit 90 upstream of the trigger valve 70 by a conduit 112.

In order to warn the operator of the vehicle 12 of low pressure in the brake system 10, a brake warning device 114 is connected to the conduit 66 which is at the lower pressure in the accumulators. The brake warning device 114 will preferably be set at some value, for example 2000 p.s.i., so that it will sound an alarm (not shown), light a light (not shown) on the operator's dash of the vehicle, or cause any other suitable warning that is desirable.

Although the system 10 is shown schematically in FIG. 1, the phantom line 115 in FIG. 1 indicates a module which contains the inverted shuttle valve 56, shuttle valves 82 and 104, trigger valve 70, brake lock valve 108 and the brake valves 30 and 44. Thus, the system can be constructed as a module with appropriate connectors (not shown) provided to interconnect the hydraulic lines and conduits thereto as required.

OPERATION OF THE PREFERRED EMBODIMENT

Normal Operation—The normal operation of the system assumes that the pump 16 is operating and sufficient hydraulic fluid is present and that the supply pressure from the pump 16 is about 2550 p.s.i. The brake warning system 114 has been set at about 2000 p.s.i. decreasing so that a warning will be sounded when the pressure drops below that value. Also, the emergency trigger valve 70 has been set so that the pilot actuator 68 will actuate the trigger valve 70 at 1650 p.s.i. or lower.

With the vehicle 12 in operation, the operator depresses the treadle 36, manually operating both brake valves 30 and 44. When this occurs, pressure from the accumulator 20 is fed through the conduit 28 to the rear brake valve 30 and then through the conduit 34 to the rear brakes 32, setting those brakes. Simultaneously, pressure is fed from the accumulator 20 through the conduit 42 into the front brake valve 44 and through the conduit 48 to the front brake 50, setting the front brake 50.

Assuming that the pressure is equal in the conduit 54 on both sides of the inverted shuttle valve 56, the conduit 66 will be at the same pressure and is above the 2000 p.s.i. warning value so that no brake alarm will be sounded. It is also assumed that the pressure in the conduit 66 is above the 1650 p.s.i. pilot actuator pressure of the trigger valve 70. Accordingly, the trigger valve 70 will not be actuated so that the pressure in the conduit 90 from the shuttle valve 82 will not pass the trigger valve 70.

The trigger valve 70 is in a position exhausting flow from the pilot 38 of the rear brake valve 30 and the pilot 46 of the front brake valve 44. When in this mode, both brakes 32 and 50 can be actuated and released by the actuation of the treadle 36 at the will of the operator.

Low Pressure in the Front Brake System—Assuming for some reason such as a leak the pressure in the accumulator 22 decreases below the preset 1650 p.s.i. actuating pressure of the trigger valve 70, the pressure in the conduit 54 on the left side of the inverted valve 56 is at 2550 p.s.i. while the pressure on the right side is below the 1650 p.s.i. value. The pressure in the conduit 66 leading from the inverted shuttle to the emergency trigger valve pilot 68 is at the lower of the two pressures, setting off the warning 114 and simultaneously actuating the trigger valve 70, causing it to move to a position wherein the conduit 90 is connected through the trigger valve 70 to the conduit 100.

The effect of this is that pressure in the conduit 80 on the left side of the shuttle valve 82 is at 2550 p.s.i. and the pressure on the right side is at the lower pressure so that the conduit 90 is now at the 2550 p.s.i. pressure, applying that pressure through the conduit 100, through the shuttle valve 104, and the conduit 102 to the pilot actuator 38 of the rear brake valve 30. As previously mentioned, the application of pressure to the pilot actuator of the brake valves overrides the manual operation by the treadle 36. Accordingly, the rear brake valve 30 is shifted to a position wherein the conduit 28 is connected directly to the conduit 34 immediately setting the rear brakes 32.

Simultaneously, the 2550 p.s.i. pressure in the conduit 100 is applied to the pilot actuator 46 of the front brake valve 44 overriding the manual operation thereof by the treadle 36 and shifting the front brake valve 44 to a position connecting the conduit 42 from the accumulator 22 to the conduit 48 and the front brakes 50. Accordingly, the front brakes 50 are set with whatever pressure is available in the accumulator 22. Once the pilot actuators 38 and 46 of the brake valves 30 and 44, respectively, have been actuated, the brakes 32 and 50 will remain set until the pressure bleeds off or until the pressure is again increased in the system whereby the normal operation can be resumed.

Low Pressure in the Rear Brake System—In the event low pressure occurs in the accumulator 20 and the system associated therewith, the system operates as previously described except that the front brakes are now applied with full pressure from the accumulator 22 while the rear brakes 32 are applied only with whatever pressure is available in the accumulator 20.

Manual Brake Lock—The system is also designed to immediately set the brakes should a malfunction occur in one of the brake valves 30 or 44. Assuming that both valve systems are fully pressurized to 2550 p.s.i., it will be observed that the conduit 90 is at that pressure and the conduit 112 connected thereto and extending to the brake lock valve 108 is also at that pressure. In normal operation, the manual brake lock valve 108 is in a position blocking pressure from entering the conduit 106.

However, should a malfunction occur, the operator can manually actuate the brake lock valve 108, moving it to a position wherein the conduit 112 and 106 are in communication therethrough. When this occurs, 2550 p.s.i. will be imposed on one side of the shuttle valve 104 while the opposite side thereof, that is, the conduit 100, is at atmospheric during normal operation. Accordingly, the conduit 102 is pressurized to the 2550 p.s.i. value actuating the pilot actuator 38 of the rear brake valve 30. The rear brake valve 30 is moved into a position connecting the accumulator 20 through the conduit 28, the brake valve 30 and the conduit 34 to the rear brakes 32 immediately setting those brakes.

To resume operation, it is necessary to manually reset the brake lock valve 108 to its initial position. In this position, the pilot actuator 38 of the rear brake valve 30 is connected through the conduit 102, the shuttle valve 104, the conduit 106, and the conduit 110 to the conduit 40 which returns to the reservoir. With the pressure thus released on the pilot actuator 38, the brake valve can again be actuated by the treadle 36.

From the foregoing detailed description, it can be seen that the brake system constructed in accordance with the invention provides apparatus and a method for braking the large heavy duty off-road vehicles utilizing very simple and dependable components and providing redundant systems in the event that problems occur in the brake system.

Having described only one embodiment in detail, it will be appreciated that many changes and modifications can be made thereto without departing from the spirit or scope of the invention.

What is claimed is:

1. An improved hydraulic brake system for heavy vehicles including front wheel and rear wheel brakes, a reservoir, and a source of pressurized hydraulic fluid, the improvement comprising:

first and second accumulators connected in parallel to each other and connected with said source of pressurized hydraulic fluid;

first pressure comparing means having a pair of inlets, said inlets connected to a respective one of said accumulators and having a low pressure outlet for the lower pressure;

second pressure comparing means having a pair of inlets, said inlets connected to a respective one of said accumulators and having a high pressure outlet for the higher pressure;

a pilot actuated trigger valve having a pilot port connected to said low pressure outlet, an inlet port connected to said high pressure outlet, an outlet port, and a return port connected to said reservoir, said trigger valve opening when the pressure in said pilot port is above a predetermined value to permit flow therethrough to said reservoir;

a front brake valve moveable from a brake position connecting said second accumulator to said front brakes and a release position connecting said reservoir to said front brakes, said front brake valve including a pilot actuator connected to said trigger valve outlet port and also including a manual actuator;

a rear brake valve moveable from a brake position connecting said first accumulator to said rear brakes to a release position connecting said reservoir to said rear brakes, said rear brakes including a pilot actuator operably connected to said trigger valve outlet port and also including a manual actuator;

whereby fluid in either accumulator passes through said first pressure comparing means, if below said predetermined value, actuates said trigger valve to direct the higher pressure in said accumulators to the pilot actuators of said brake valves overriding the manual actuators thereof and opening both said brake valves to supply available pressure from each accumulator, respectively, to said front and rear brakes and, if above said predetermined value, connects the pilot actuators of said brake valves to said reservoir through said trigger valve for operation of said brakes by said manual actuators;

a manually-actuated brake lock valve having an inlet connected to said high pressure outlet, another inlet connected to said reservoir, and an outlet; and, third pressure comparing means connected to said brake lock valve outlet, to said trigger valve outlet port and to the pilot actuators of both said brake valves, whereby, upon malfunction of either manual actuator of said brake valves, manual actuation of said brake lock valve imposes accumulator pressure through said third pressure comparing means on the pilot actuator of said rear brake valve and connects the pilot actuator of said front brake valve to reservoir immediately applying said rear brakes and releasing said front brakes.

2. An improved hydraulic brake system for heavy vehicles including front wheel and rear wheel brakes, a reservoir, and a source of pressurized hydraulic fluid, the improvement comprising:

first and second accumulators connected in parallel to each other and connected with said source of pressurized hydraulic fluid;

first pressure comparing means having a pair of inlets, said inlets connected to a respective one of said accumulators and having a low pressure outlet for the lower pressure;

second pressure comparing means having a pair of inlets, said inlets connected to a respective one of said accumulators and having a high pressure outlet for the higher pressure;

a pilot actuated trigger valve having a pilot port connected to said low pressure outlet, an inlet port connected to said high pressure outlet, an outlet port, and a return port connected to said reservoir, said trigger valve opening when the pressure in said pilot port is above a predetermined value to permit flow therethrough to said reservoir;

a front brake valve moveable from a brake position connecting said second accumulator to said front brakes and a release position connecting said reservoir to said front brakes, said front brake valve including a pilot actuator connected to said trigger valve outlet port and also including a manual actuator;

a rear brake valve moveable from a brake position connecting said first accumulator to said rear brakes to a release position connecting said reservoir to said rear brakes, said rear brakes including a pilot actuator operably connected to said trigger valve outlet port and also including a manual actuator;

whereby fluid in either accumulator passes through said first pressure comparing means, if below said predetermined value, actuates said trigger valve to direct the higher pressure in said accumulators to the pilot actuators of said brake valves overriding the manual actuators thereof and opening both said brake valves to supply available pressure from each accumulator, respectively, to said front and rear brakes and, if above said predetermined value, connects the pilot actuators of said brake valves to said reservoir through said trigger valve for operation of said brakes by said manual actuators;

brake alarm means connected to said low prespsure outlet for indicating that the pressure in said system is below said predetermined value;

a manually-actuated brake lock valve having an inlet connected to said high pressure outlet, another inlet connected and to said reservoir, and an outlet; and, third pressure comparing means connected to said brake lock valve outlet, to said trigger valve outlet port and to the pilot actuators of both said brake valves, whereby, upon malfunction of either manual actuator of said brake valves, manual actuation of said brake lock valve imposes accumulator pressure through said third pressure comparing means on the pilot actuator of said rear brake valve and connects the pilot actuator of said front brake valve to reservoir immediately applying said rear brakes and releasing said front brakes.

* * * * *

UNITED STATES PATENT AND TRADEMARK OFFICE
CERTIFICATE OF CORRECTION

PATENT NO. : 4,758,052

DATED : July 19, 1988

INVENTOR(S) : Bechman et al

It is certified that error appears in the above-identified patent and that said Letters Patent is hereby corrected as shown below:

In Column 4, Line 42, after "inverted" and before "valve", insert -- shuttle --.

In Column 8, Line 8, change "prespsure" to -- pressure --.

Signed and Sealed this

Sixth Day of December, 1988

Attest:

DONALD J. QUIGG

*Attesting Officer*  *Commissioner of Patents and Trademarks*